United States Patent [19]

Buisman

[11] Patent Number: 5,474,682
[45] Date of Patent: Dec. 12, 1995

[54] METHOD FOR REMOVING SULPHUR COMPOUNDS FROM WATER

[75] Inventor: Cees J. N. Buisman, Harich, Netherlands

[73] Assignee: Paques B.V., Balk, Netherlands

[21] Appl. No.: 122,586

[22] PCT Filed: Apr. 3, 1992

[86] PCT No.: PCT/NL92/00064

§ 371 Date: Dec. 6, 1993

§ 102(e) Date: Dec. 6, 1993

[87] PCT Pub. No.: WO92/17410

PCT Pub. Date: Oct. 15, 1992

[30] Foreign Application Priority Data

Apr. 4, 1991 [NL] Netherlands ............................ 9100587

[51] Int. Cl.$^6$ .............................. C02F 3/28; B01D 53/00; C01B 17/24
[52] U.S. Cl. .......................... 210/610; 210/612; 210/630; 210/631; 95/181; 95/235
[58] Field of Search ..................................... 210/603, 605, 210/610, 611, 612, 613, 630, 631, 903; 95/181, 235

[56] References Cited

U.S. PATENT DOCUMENTS

| 4,183,810 | 1/1980 | Baenens et al. ........................ 210/605 |
| 4,384,956 | 5/1983 | Mulder .................................... 210/603 |
| 4,519,912 | 5/1985 | Kauffman et al. ........................ 210/611 |
| 5,227,069 | 7/1993 | Van Dort et al. ........................ 210/610 |
| 5,269,929 | 12/1993 | Sublette et al. .......................... 210/610 |

FOREIGN PATENT DOCUMENTS

| 0326457 | 8/1989 | European Pat. Off. . |
| 0436254 | 7/1991 | European Pat. Off. . |
| 57-145009 | 9/1982 | Japan . |
| 8602190 | 3/1988 | Netherlands . |
| 8801009 | 11/1989 | Netherlands . |

OTHER PUBLICATIONS

By J. Maree et al., "Biological Sulphate Removal in an Upflow Packed Bed Reactor", 1985, vol. 19, No. 9, pp. 1101–1106, Great Britain.
By F. Plahl–Wabnegg et al., "Biologische Schwermetallentfernung bei Industrieabwassern", 1984, vol. 125, pp. 424–426.

Primary Examiner—Thomas Wyse
Attorney, Agent, or Firm—Young & Thompson

[57] ABSTRACT

The invention provides a method for removing sulphur compounds from water by anaerobic reduction of the sulphur compounds to sulphide, followed by a partial oxidation of the sulphide to elementary sulphur. The anaerobic reduction is carried out at elevated temperature, either continuously at a temperature of 45°–70° C., or periodically at a temperature of 55°–100° C. If the reduction is carried out periodically, a single rise in temperature for a few hours to several days over a period of 3–6 months can suffice. The method is particularly applicable to the removal of sulphate, sulphite and thiosulphate.

15 Claims, 1 Drawing Sheet

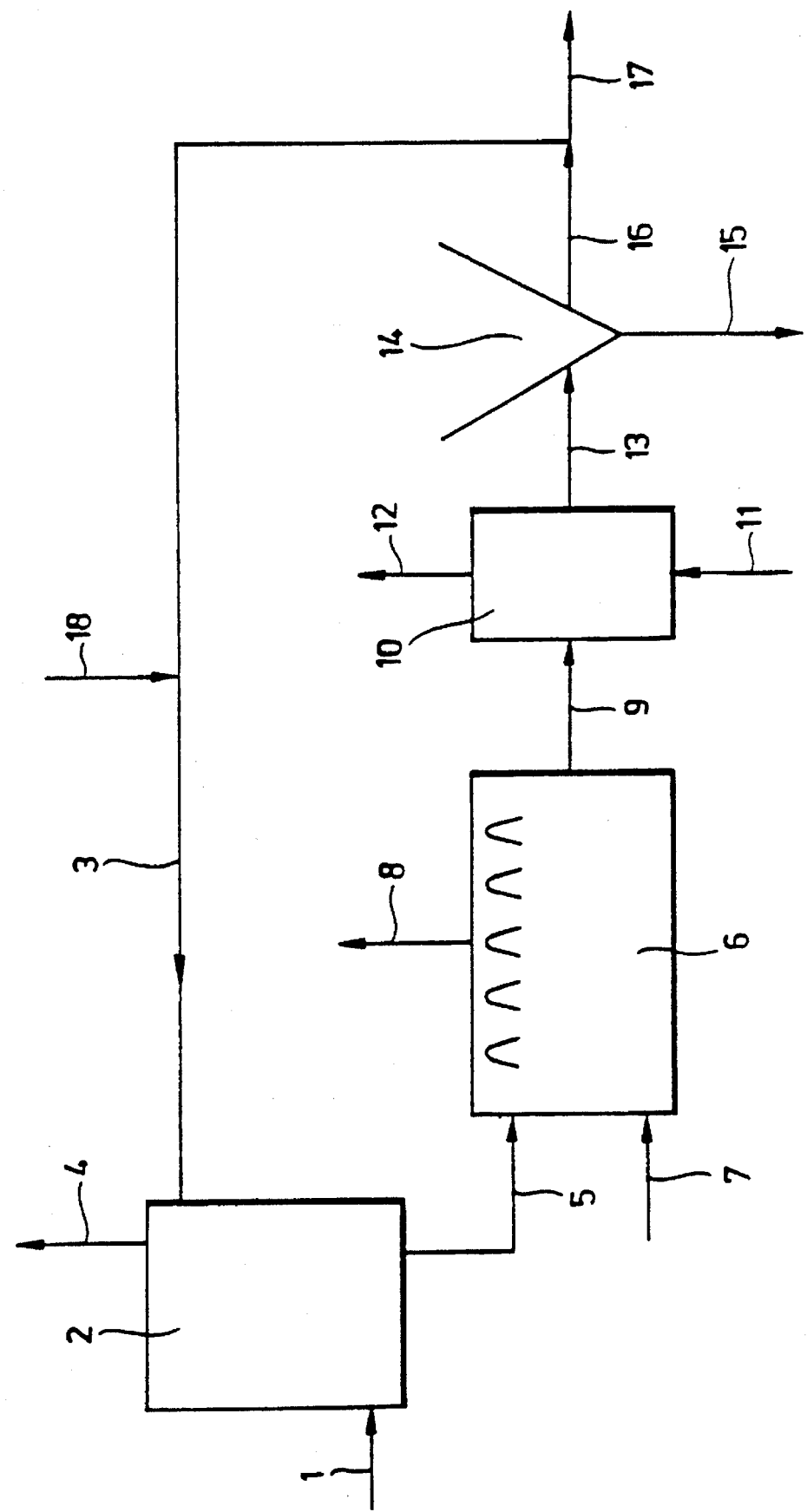

METHOD FOR REMOVING SULPHUR COMPOUNDS FROM WATER

FIELD OF THE INVENTION

The invention relates to a method for removing sulphur compounds from water.

BACKGROUND OF THE INVENTION

The presence of sulphur compounds in water is usually an unacceptable factor. In the case of sulphate, sulphite and thiosulphate, the principal drawbacks are attack on the sewer, eutrophication and silting. In addition, heavy metals, which are particularly undesired because of their toxic properties, are frequently also present in water containing a large amount of sulphur compounds.

Industries which produce effluents containing sulphur compounds include the viscose and edible oils industry, tanning, paper, rubber, printing and photo-graphic industries, metallurgic industry and mining industry.

Wash water from flue gas treatment plants is a type of effluent which contains sulphur compounds, in particular sulphite, that can be removed only with difficulty. Flue gases from power stations and waste incinerators cause extensive pollution of the environment due to the presence of acidifying sulphur dioxide ($SO_2$). The harmful effects of acidification are generally known.

Two types of method are available in general for the removal of sulphur-containing compounds, that is to say physicochemical methods and biological methods.

Physicochemical treatment methods include ion exchange and membrane filtration (electrodialysis and reverse osmosis). Disadvantages of such methods are the high costs and the large stream of waste which results. In the case of flue gas treatment, absorption on lime or ammonia is usually employed. In this case large amounts of gypsum or ammonium sulphate are formed; a part of these wastes could be re-used. However, particularly in the case of gypsum the possible uses are becoming ever fewer because the quality demands for gypsum are becoming ever more stringent.

In the case of a biological treatment, sulphate, sulphite and other sulphur compounds are reduced by sulphate-reducing bacteria in an anaerobic step to give sulphide, which in turn can be oxidized to elementary sulphur. The advantage of such a method is that only small waste streams remain because the sulphur formed can be re-used. However, the disadvantage is that, especially when the effluent contains little organic matter, electron donors have to be added in order to provide sufficient reduction equivalents for the sulphate-reducing bacteria (SRB). The most important electron donors are methanol, ethanol, glucose, hydrogen and carbon monoxide. The use of these or other electron donors has the effect of substantially increasing the cost of this method of removal of sulphur from waste streams.

Organic compounds having two or more carbon atoms are found to decompose under anaerobic conditions to give hydrogen and acetate. The hydrogen can be used as an electron donor for the reduction of sulphate and sulphite and the like, but, under normal conditions, about 50% of the acetate is converted to methane by methane producing bacteria (MPB). Methanol (C-1) is converted to methane for about 90% under normal conditions. Methane formation has the disadvantages that additional electron donor has to be added (increasing the costs) and that a gas stream contaminated with $H_2S$ is formed which has to be washed and burnt off in the flare.

It has been found that sulphur compounds can be effectively removed from water by continuous or intermittent use of an elevated temperature during the anaerobic treatment, without large amounts of added electron donor being needed, because little or no methane is produced.

According to the method of the invention, the sulphur compounds are therefore removed by subjecting the water to an anaerobic treatment with bacteria which reduce sulphur and/or sulphate, if necessary with the addition of electron donors, and carrying out the treatment, at least for a portion of the time, at an elevated temperature, in particular a temperature of more than 45° C.

The elevated temperature can be used continuously or virtually continuously, for example when an inexpensive energy source is available, as in the case of hot flue gases and/or a warm wash liquid. A suitable elevated temperature is then in particular a temperature of 45°–75° C. and more particularly of 50°–70° C. In the treatment of flue gases, a continuous temperature of 50°–60°, especially 50°–55° C. for the biological reduction of sulphite in the wash water is convenient.

Preferably, the anaerobic treatment is carried out at an elevated temperature for a portion of the time, e.g. periodically. A temperature of 55°–100° C., preferably 60°–100° C. and more preferably 60°–80° C. is particularly suitable for the periodic increase in temperature. Thus, the temperature is raised to a maximum of above 45° C. for a single period or periodically. The level of this maximum and the time for which this maximum is maintained can be selected as a function of the nature of the effluent to be treated, the micro-organisms used and the desired degree and speed of treatment. general, a higher temperature has a better effect. The elevated temperature can be maintained for a period of from several minutes or hours to several days, for example 1 week; the treatment can then be carried out for, for example, a few days to a few months, at normal temperature, for example 15°–40° C., after which the temperature can be raised again as described above.

Using the method according to the invention, the efficiency of the electron donors is substantially improved. For example, it is found that virtually all acetate is consumed at the elevated temperature by the bacteria which reduce sulphate and sulphite and that methane production stops. Consequently, appreciably less electron donor (for example 30% less in the case of ethanol) has to be added. It is assumed that the methane-producing bacteria (MPB) are killed at high temperature, while the sulphate-reducing bacteria (SRB) form spores which become active again at lower temperature.

Table 1 shows the effects of a short temperature increase (15 to 30 minutes) on the activity of sulphate-reducing bacteria (SRB) (absolute and relative) with respect to acetate as an electron donor and the electron donor efficiency, in the reduction of sulphate in a batch experiment.

TABLE 1

| Temperature (°C.) | Activity SRB (mg S/l.h) | (%) | Acetate efficiency (%) |
|---|---|---|---|
| 30 (blank) | 34.4 | 100 | 67 |
| 50 | 45.1 | 131 | 80 |
| 70 | 60.7 | 177 | 100 |

TABLE 1-continued

| Temperature (°C.) | Activity SRB (mg S/l.h) | (%) | Acetate efficiency (%) |
|---|---|---|---|
| 95 | 80.2 | 233 | 100 |

In the case of flue gas treatment, the $SO_2$ can be removed from the flue gases using a large scrubber and then fed in dissolved form in the wash water to the anaerobic reactor. The increase in temperature for the anaerobic treatment can then be effected by not cooling or even heating the wash water. The dissolved $SO_2$ is mainly in the form of sulphite and bisulphite. This sulphite and bisulphite is converted to sulphide in the anaerobic biological reactor.

The sulphide formed can then be oxidized to elementary sulphur in a separate reactor. The elementary sulphur can be used as raw material for diverse applications.

This oxidation is preferably carried out in a second biological reactor. In the second biological reactor, oxygen metering is controlled such that the sulphide is mainly oxidized to sulphur and not, or only to a slight extent, to sulphate. The partial oxidation can be effected by, for example, keeping the amount of sludge in the reactor low or by using a short residence time. However, it is preferred to use a deficiency of oxygen. The amount of oxygen can be rapidly and simply adjusted to the requirements of the stream to be treated.

The method according to the invention can be used for a wide variety of sulphur compounds: in the first place, the method is particularly suitable for the removal of inorganic sulphate and sulphite. Further possible compounds are other inorganic sulphur compounds such as thiosulphate, tetrathionate, dithionite, elementary sulphur and the like. Organic sulphur compounds, such as alkanesulphonates, dialkyl sulphides, dialkyl disulphides, mercaptans, sulphones, sulphoxides, carbon disulphide and the like can also be removed from water by the method of the invention.

The product from the method according to the invention is, if post-oxidation is employed, elemental sulphur, which can be separated off simply from water, for example by settling, filtration, centrifuging or flotation, and can be re-used.

For the post-oxidation of sulphide with sulphide-oxidizing bacteria and a deficiency of oxygen, use can be made of the method according to Netherlands Patent Application 88.01009. The bacteria which can be used in this case come from the group of colourless sulphur bacteria, such as Thiobacillus, Thiomicrospira, Sulfolobus and Thermothrix.

The bacteria which can be used for the anaerobic step of the method according to the invention, for the reduction of sulphur compounds to sulphide, are in particular sulphur- and sulphate-reducing bacteria, such as those of the genera Desulfotomaculum, Desulfomonas, Thermodesulfobacterium, Desulfovibrio, Desulfobulbus, Desulfobacter, Desulfococcus, Desulfonema, Desulfosarcina, Desulfobacterium and Desulfuromas. In particular, the genera Desulfotomaculum, Desulfomonas and Thermodesulfobacterium have optimum growth temperatures from 45° to 85° C. The SRB can further be divided according to their metabolism: the completely oxidizing sulphate reducing bacteria (c-SRB) are able to reduce organic substrates to $CO_2$, whereas the incompletely oxidizing sulphate reducing bacteria (i-SRB) oxidize the organic substrate to acetate which cannot be oxidized further. The i-SRB grow significantly faster (about 5 times) than the c-SRB. Bacteria of the suitable types are generally available from diverse anaerobic cultures and/or grow spontaneously in the reactor.

An electron donor is needed to reduce the sulphur compounds to sulphide. If water which contains little or no organic matter has to be treated, an electron donor of this type must be added. Depending on the application, electron donors which can be used for this purpose are, for example: hydrogen, carbon monoxide and organic compounds, such as fatty acids, alcohols, polyols, sugars, starches and organic waste. Methanol, ethanol, polyols such as starches and inexpensive sources of glucose, in particular corn steep liquor, and acetic acid are preferably used. If necessary, nutrients are also added in the form of nitrogen, phosphate and trace elements.

Various aqueous effluents can be treated using the method according to the invention, such as domestic waste water, mine effluent, industrial effluent, for example from the photographic and printing industry, the metal industry, fiber industry, leather industry, paper industry, oil industry and polymer industry, and wash water from flue gas treatment plants.

BRIEF DESCRIPTION OF THE DRAWING

The FIGURE depicts an installation suitable for carrying out the process of the invention.

DETAILED DESCRIPTION OF THE INVENTION

In the case of flue gas treatment, the method according to the invention can, for example, be carried out in an installation such as is shown diagrammatically in the figure. According to the figure, the flue gas contaminated with sulphur dioxide is fed via 1 into a scrubber 2. In this scrubber the flue gas is treated in counter-current with wash water, which is supplied via 3. The treated flue gas is removed via 4 or further treated. The sulphite-containing wash water is fed via line 5 to an anaerobic reactor 6. An electron donor, such as ethanol, is also fed to the anaerobic reactor 6, via 7. Line 5 or reactor 6 is provided with a heating installation (heat exchanger) for raising the temperature of the anaerobic treatment (not shown). The gas formed in the reactor, which is essentially $CO_2$ and to a lesser extent $H_2S$, is removed via 8 to a gas treatment installation (not shown). The anaerobic effluent from the reactor is fed via 9 to an aerobic or partially aerobic reactor 10, to which air is also supplied, via 11. The excess air is removed via 12. The sulphurcontaining effluent is fed via 13 to a settling tank 14, where the sulphur is separated off and is removed via 15. The effluent from the sulphur settling is removed via 16 and can be re-used as wash water. A fraction can be removed via 17 and if necessary replenishing water, which can also contain buffer and nutrients, is supplied at 18.

EXAMPLE

Effluent with a sulphur content of about 1 g/l and a COD (chemical oxygen demand) in the form of acetate of likewise 1 g/l was treated in a treatment installation according to the figure using a residence time of 4 hours. At an anaerobic reaction temperature of 30° C., 100% of the acetate was converted to methane and no sulphate reduction took place. After the temperature was raised to 55° C., the methane formation decreased and this became negligibly small after about one week. 95% of the acetate added was now consumed for the sulphate reduction. The methane formation distinctly increased again only after a few months.

I claim:

1. Method for removing sulphur compounds from water, which comprises: subjecting the water to anaerobic treatment with sulphur- and/or sulphate-reducing bacteria, said anaerobic treatment being carried out at a temperature of above 45° C. for at least a portion of the time.

2. Method according to claim 1, wherein the anaerobic treatment is carried out at a temperature of above 50° up to 100° C. for at least a portion of the time.

3. Method according to claim 1, wherein the anaerobic treatment is carried out at a temperature of 50°–70° C. for at least a portion of the time.

4. Method according to claim 2, wherein the anaerobic treatment is carried out at a temperature of 60°–100° C. for a portion of the time.

5. Method according to claim 1, wherein the anaerobic treatment is carried out at said temperature periodically for 15 minutes to 7 days.

6. Method according to claim 1, further comprising: adding an electron donor to the water.

7. Method according to claim 6, wherein an electron donor is used from which acetate is formed in an anaerobic medium.

8. Method according to claim 6, wherein the electron donor used is methanol, ethanol or glucose.

9. Method according to claim 1, wherein sulphate is removed from water.

10. Method according to claim 1, wherein sulphite is removed from water.

11. Method according to claim 1, wherein thiosulphate is removed from water.

12. Method according to claim 1, wherein the anaerobic treatment results in the formation of sulphide which is essentially oxidized to elemental sulphur, and the sulphur formed is removed.

13. Method according to claim 12, wherein the sulphide is partially oxidized with sulphide-oxidizing bacteria in the presence of a deficiency of oxygen.

14. Method for the treatment of sulphur-containing flue gas, which comprises: washing the flue gas with a wash liquid so as to obtain a sulphur-containing water, and regenerating said wash liquid by subjecting the water to anaerobic treatment with sulphur- and/or sulphate-reducing bacteria, said anaerobic treatment being carried out at a temperature of above 45° C. for at least a portion of the time.

15. Method according to claim 14, wherein the anaerobic treatment is carried out at a temperature of 50°–60° C.

* * * * *